D. BEAUMONT.
Steam-Plow.
No. 162,884.
Patented May 4, 1875.
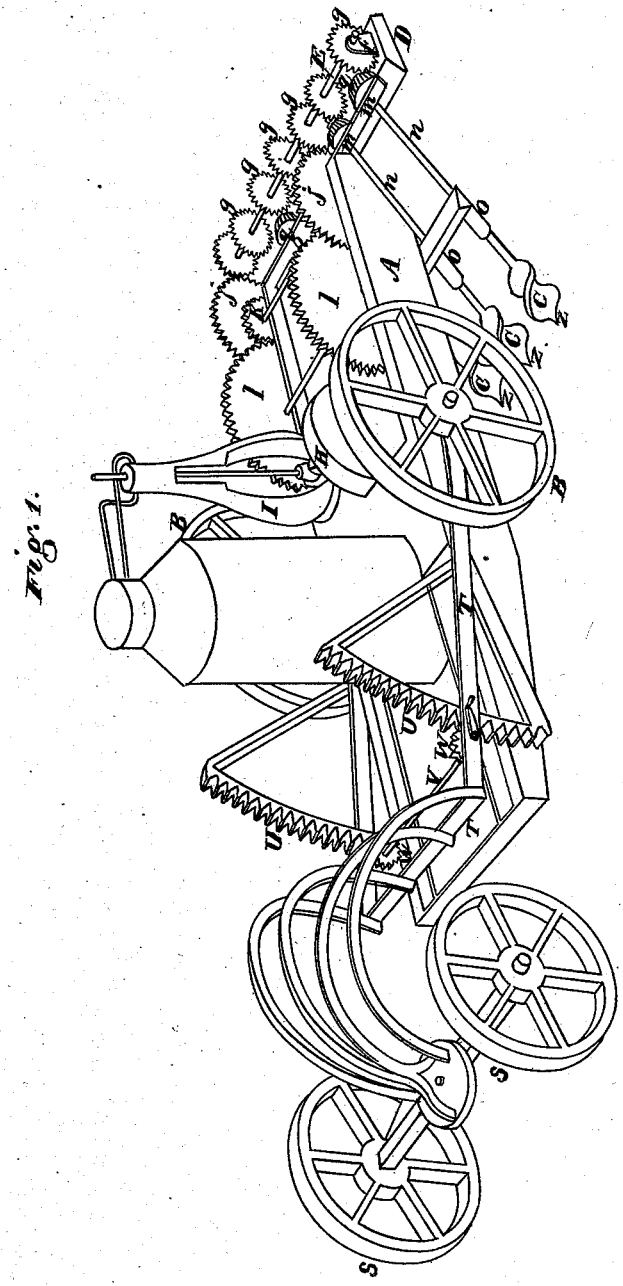
Witnesses
Geo. H. Strong
Jn. L. Bonne
Inventor,
Duncan Beaumont
by Davey & Co
Attys
THE GRAPHIC CO.PHOTO-LITH.39 & 41 PARK PLACE,N.Y.

UNITED STATES PATENT OFFICE.

DUNCAN BEAUMONT, OF SACRAMENTO, CALIFORNIA.

IMPROVEMENT IN STEAM-PLOWS.

Specification forming part of Letters Patent, No. 162,884, dated May 4, 1875; application filed March 10, 1875.

*To all whom it may concern:*

Be it known that I, DUNCAN BEAUMONT, of Sacramento city and county, State of California, have invented an Improved Steam Plow and Cultivator; and I do hereby declare the following description and accompanying drawings are sufficient to enable any person skilled in the art or science to which it most nearly appertains to make and use my said invention or improvement without further invention or experiment.

My improved plowing and cultivating device can be used in connection with a two-wheeled vehicle similar to a gang-plow, and which is propelled by animal power, or it can be connected with a traction-engine which is moved by steam.

My improved plowing apparatus consists of two or more short augers mounted at a proper angle in a frame at the rear of a truck or wagon, and driven by means of suitable gearing, connecting either with the bearing-wheels of the wagon, or with a steam-engine located upon the wagon-frame, so that the worm of the augers will serve as rotating mold-boards to lift and turn the sods which are raised by the shares or points of the augers.

In order to describe my invention so that others will be able to understand its nature and operation, reference is had to the accompanying drawing, forming a part of this specification, in which—

Figure 1 is a perspective view of my improved mechanism.

A represents a wagon or truck-frame, which is supported upon the two bearing-wheels B B. The frame A extends far enough backward in rear of the wheels B B to permit the augers or cultivators C C C to be mounted at the required angle at the rear end of the frame. D is a beam which is secured transversely across the rear end of the frame A, and above which the shaft E is supported in standards or boxes $f$, at suitable points along the length of the beam. Upon this shaft I secure, at the proper distance apart, as many bevel-gear wheels $g$ as there are auger-plows to be rotated, and the shaft E derives its motion, through the gears $j$ $k$ $l$, from the driving-shaft H of an engine, I, which is located on the wagon. The front upper corner of the beam D is beveled, as shown, and a series of boxes, $m$ $m$, is secured upon the inclined edge thus formed, in which the upper end of the auger-shanks $n$ are secured, while the lower ends are supported in a similar series of boxes, $o$, below the frame, and in advance of the upper boxes, so as to cause the augers to stand at an angle projecting forward from the rear transverse beam D. The plows each consist of a short section or single twist of an auger, C, and each auger is provided with a shank, $n$, which, as above described, is supported at two points, $m$ $o$. To the upper end of each shank $n$ a bevel-wheel, $q$, is secured, which engages with one of the bevel-wheels $g$ on the shaft E, so that the rotation of the shaft causes the augers to rotate. The angle of the augers should be regulated according to the pitch of the twist, so as to give the effect of a rotating mold-board. The point or share of these auger plows I construct on a curved line, as at $z$, so as to gradually join one web of the spiral with the other.

Various styles and forms of shares could be applied to the augers, but I have constructed my augers in the simplest manner. The augers are placed close enough to each other to permit each auger or spiral mold-board to turn its land into the furrow left by the auger next to it; or a double series of augers can be used, one series being arranged back of the other, so that they will alternate, and thus cover the entire width of land. It will therefore be seen that where the augers are given a rotary motion in the ground and the wagon is moved forward, they will turn a series of furrows similar to that turned by ordinary plows, and that the boring action of the augers will cut into hard soil with much greater facility, and consequently at the expenditure of a less amount of power, than the plowing devices ordinarily employed.

To accomplish the raising and lowering of the rear end of the wagon or truck-frame, in order to throw the plows in or out of the ground, I employ a pair of steering-wheels, S S, in advance of the truck-frame. A turn-table at the middle of the axle which connects these wheels, I connect with one end of a hinged frame, T, by means of a goose-neck or other suitable connection. The end beam of the frame T extends across in front of the truck-frame, and its two side beams extend along each side of the truck-frame, and have their rear ends secured loosely to the axle which connects the bearing-wheels B B. A curved rack, U, is secured upon each side of the truck-frame A, near its forward end. A shaft, V, extends across from side to side of the frame T, just in front of the racks U, and pinions W upon this shaft engage with the racks. A crank, X, at one end of the shaft V, serves to turn the shaft in order to raise and lower the forward end of the frame A. As the weight of the boiler is in advance of the axle which connects the wheels B, the forward end of the frame can be easily raised and lowered by means of this crank-shaft.

Having thus described my invention, what I claim, and desire to secure by Letters Patent, is—

The balanced frame A, having the gear-wheels $j\ k\ l$, bevel-wheels $g\ q$, and spiral plows C, placed at an angle with the ground and projecting forward, in combination with the connecting-frame T, steering-wheels S, toothed segments U, shaft V, and pinion W, all arranged and operating substantially as shown and described.

DUNCAN BEAUMONT.

Witnesses:
MATT. F. JOHNSON,
WM. G. ENGLISH.